United States Patent
Feigenblum et al.

(10) Patent No.: US 8,794,950 B2
(45) Date of Patent: Aug. 5, 2014

(54) DEVICE FOR CONVERTING MATERIALS USING INDUCTION HEATING AND DEFORMABLE COMPACTING MEANS

(75) Inventors: Jose Feigenblum, Grenoble (FR); Alexandre Guichard, Mont du Chat (FR)

(73) Assignee: ROCTOOL, Le Bourget du Lac (FR)

( * ) Notice: Subject to any disclaimer, the term of this patent is extended or adjusted under 35 U.S.C. 154(b) by 814 days.

(21) Appl. No.: 12/922,969

(22) PCT Filed: Mar. 17, 2009

(86) PCT No.: PCT/FR2009/000280
§ 371 (c)(1),
(2), (4) Date: Nov. 10, 2010

(87) PCT Pub. No.: WO2009/125079
PCT Pub. Date: Oct. 15, 2009

(65) Prior Publication Data
US 2011/0057357 A1    Mar. 10, 2011

(30) Foreign Application Priority Data
Mar. 17, 2008   (FR) ...................................... 08 51728

(51) Int. Cl.
*B29C 35/00* (2006.01)
*B29C 35/12* (2006.01)

(52) U.S. Cl.
USPC ................... 425/174.8 R; 425/389; 425/407; 219/634

(58) Field of Classification Search
USPC ......................... 425/174.8 R, 388–389, 407; 219/602–603, 615–617, 632, 633–635, 219/646, 649, 657, 759, 659, 757
See application file for complete search history.

(56) References Cited

U.S. PATENT DOCUMENTS

| 5,641,422 A | 6/1997 | Matsen et al. |
| 5,747,179 A * | 5/1998 | Matsen et al. ................. 425/389 |

(Continued)

FOREIGN PATENT DOCUMENTS

| FR | 2816237 A1 | 5/2002 |
| FR | 2890588 A1 | 3/2007 |

(Continued)

OTHER PUBLICATIONS

International Search Report, dated Oct. 13, 2009, from corresponding PCT application.

*Primary Examiner* — Joseph S Del Sole
*Assistant Examiner* — Thukhanh Nguyen
(74) *Attorney, Agent, or Firm* — Young & Thompson

(57) ABSTRACT

A heating device for the transformation of a material, includes: a lower mold element or matrix, made of an electrically conductive material and having a molding zone for contacting with the material to be transformed; an upper element that lacks a molding zone, made of an electrically conductive material; inductor elements for generating a magnetic field that envelops the matrix and the upper element, with the matrix and the element being electrically insulated from one another during the induction heating phase so that the surfaces opposite these two elements delimit an air gap in which the magnetic field that induces currents circulates at the surface of the molding zone of the matrix, thus making it possible to localize the action of the inductors at the interface of the molding zone/material to be transformed; and deformable pressure element, arranged between the matrix and the upper element, able to exert uniform pressure on the material to be transformed.

16 Claims, 3 Drawing Sheets

(56) References Cited

U.S. PATENT DOCUMENTS

| | | | |
|---|---|---|---|
| 6,979,807 B2 * | 12/2005 | Anderson et al. | 219/757 |
| 8,372,327 B2 * | 2/2013 | Matsen et al. | 264/258 |
| 2005/0035115 A1 | 2/2005 | Anderson et al. | |

FOREIGN PATENT DOCUMENTS

| | | |
|---|---|---|
| WO | 9800274 A1 | 1/1998 |
| WO | 2005094127 A1 | 10/2005 |
| WO | 2007031660 A1 | 3/2007 |

* cited by examiner

DEVICE FOR CONVERTING MATERIALS USING INDUCTION HEATING AND DEFORMABLE COMPACTING MEANS

This invention relates to a device and a process using induction heating and deformable pressure means, in particular for the purpose of implementing the transformation or the molding of materials, in particular composite materials with a thermoplastic or thermosetting matrix.

A device is known, such as the one that is described in International Application No. WO2005/094127, which makes it possible to locate the surface induction heating so as to delimit the mold/material interface heating.

Such a device comprises inductors surrounding two mold elements, made of an electrically conductive material and comprising a heating zone that is designed to be close to or in contact with the material to be transformed, whereby the mold elements are insulated electrically from one another. Thus, using this electrical cutoff between the two mold elements, the surfaces opposite the latter delimit an air gap in which the magnetic field that is created by the inductors circulates. The magnetic field then induces electric currents on the surface of the mold elements, and in particular at the surface of the heating zone of each mold element, thus making it possible to localize the surface heating.

Such a device makes possible a very rapid and very significant rise in temperature of the heating zones since the energy that is generated by the inductors is injected directly at the surface of the heating zones, in a very slight thickness, typically several tenths of a millimeter. It requires, however, the production of two half-molds corresponding to strict mechanical and machining constraints. Although higher-performing, such a device therefore proves costly.

In contrast, such a device exhibits limited performances when it is desired to create geometrically complex parts, in particular those that have shapes that cannot be developed and in particular when the latter have surfaces that are perpendicular to the attachment plane of the mold, or with a slight taper. Actually, the part undergoes the pressure exerted by the upper half-mold (or punch) on the lower half-mold (or matrix). For this purpose, the molding zone of the punch has a complementary shape of the molding zone of the matrix, and the punch can move along an axis that is perpendicular to the attachment plane. This translational movement makes it possible to exert on the part the pressure that is required for the surfaces that are essentially parallel to the attachment plane of the mold (i.e., perpendicular to the direction of movement of the punch) or slightly inclined relative to this plane. Moreover, because of this unique translational movement, for the vertical surfaces (i.e., perpendicular to the attachment plane) or having an angle with a slight taper, the punch is not able to exert adequate pressure to correctly flatten the part on the molding zone of the matrix. This therefore produces problems of final quality of the part that is created (surface state, mechanical strength, impregnation of fibers, . . . ).

The object of this invention is to remedy the drawbacks of the prior art by proposing a device for heating material(s) allowing a very quick and controllable rise in temperature with a very high precision and making it possible to create geometrically complex parts with the required quality. Thus, the invention relates to a device that uses induction heating coupled to an air gap and equipped with deformable pressure means.

More specifically, the invention relates to a heating device for the transformation of a material, comprising:

A lower mold element, or matrix, made of an electrically conductive material and comprising a molding zone designed to be in contact with the material to be transformed;

An upper element that lacks a molding zone, made of an electrically conductive material;

Inductor means for generating a magnetic field that envelops the matrix and the upper element, with the matrix and the element being electrically insulated from one another during the induction heating phase so that the surfaces opposite these two elements delimit an air gap in which the magnetic field that induces currents circulates at the surface of the molding zone of the matrix, thus making it possible to localize the action of the inductors at the interface of the molding zone/material to be transformed;

Deformable pressure means, arranged between the matrix and the upper element, able to exert uniform pressure on the material to be transformed.

Thus, the invention makes it possible to limit the induction heating to one surface so as to localize the heating at the mold/material interface, which makes it possible to limit the energy consumption and therefore to improve the energy yield of the device while ensuring pressure that is uniformly distributed on the part. Actually, the deformable pressure or compacting means ensure an isobar pressure on the part independently of the shape of the part. The productivity is also increased relative to the known devices using deformable pressure means, owing to reduced heating and cooling times, and a very low fraction of the volume of the mold is subjected to induction heating.

In one embodiment, transparent wedges in the magnetic field ensure electrical insulation between the matrix and the upper element.

In one embodiment, the insulating wedges also ensure sealing between the deformable pressure means, on the one hand, and the matrix and/or the upper element, on the other hand.

In one embodiment, the pressure means comprise a flexible membrane.

In one embodiment, the flexible membrane is linked in a sealed manner to the matrix, means making it possible to generate a partial vacuum between the membrane and the matrix.

In one embodiment, the flexible membrane is linked in an airtight manner to the upper element, whereby means make it possible to generate overpressure between the membrane and the upper element.

In one embodiment, the device comprises means for generating underpressure between the membrane and the matrix and means for generating overpressure between the membrane and the upper element, whereby these means are able to be actuated simultaneously or successively.

In one embodiment, the device comprises two flexible membranes, whereby the first is an underpressure membrane and the second is an overpressure membrane.

In one embodiment, the pressure means are made integral with the upper element.

In one embodiment, the pressure means are made integral with the matrix.

In one embodiment, the molding zone comprises a magnetic compound, preferably with high relative magnetic permeability and high electrical resistivity, for example a nickel-, chromium-, and/or titanium-based steel.

In one embodiment, the remainder of the matrix comprises a material that is different from the one that constitutes the molding zone, in particular a non-magnetic or not very magnetic material, for example stainless steel.

In one embodiment, the matrix comprises a magnetic material, whereby its surfaces that are located opposite the inductor means, with the exception of the surface of the molding zone, are covered by a shield layer of a non-magnetic material that prevents the penetration of the magnetic field into the matrix.

In one embodiment, the upper element comprises a non-magnetic material, preferably with low electrical resistivity, such as aluminum.

In one embodiment, the molding zone comprises a cooling channel network.

In one embodiment, the upper element comprises a cooling channel network.

In one embodiment, the frequency F of the magnetic field that is generated by the inductor means is at least equal to 10 kHz and preferably at most equal to 100 kHz.

In one embodiment, the inductor means comprise two parts that can be separated and that are respectively integral with the matrix and the upper element.

Finally, the invention also relates to a process for the production of a part that uses a device as defined above.

Other characteristics and advantages of the invention will emerge with the description given below, whereby the latter is carried out by way of non-limiting example by referring to the drawings below, in which.

Figure 1:
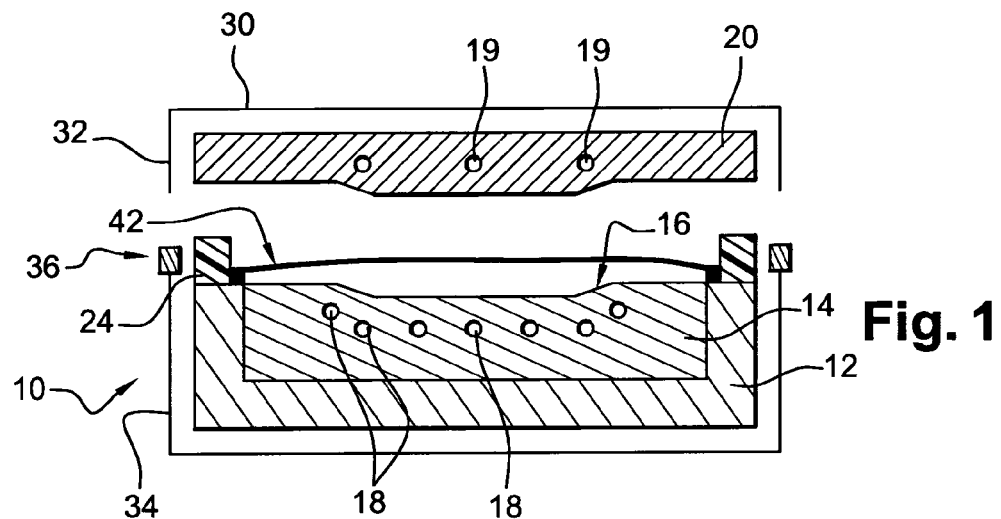
FIGS. 1 and 2 show a device according to the invention.
Figure 2:
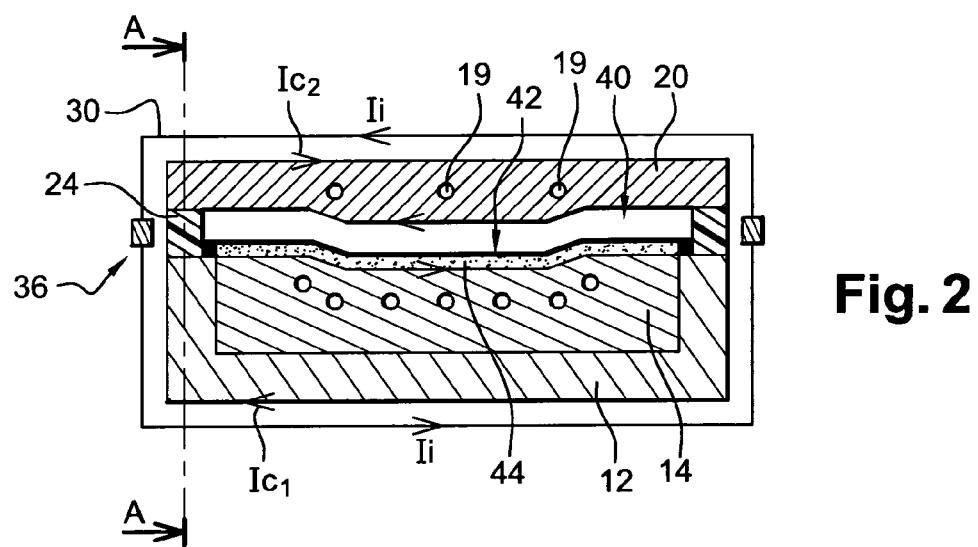

The device 10 that is shown in FIGS. 1 and 2 comprises a mold element 12, which is a lower half-mold, or matrix. This mold element 12 is made of an electrically conductive material, of which one part 14 constitutes a heating zone, or a molding zone. Opposite the molding zone 14, there is arranged an upper element 20 that is made of an electrically conductive material that lacks a molding zone. The upper element 20 can move relative to the matrix along a vertical axis, perpendicular to the attachment plane of the mold. The first function of the upper element 20 is to serve as an electroconductive charge so as to form an air gap between the matrix 12 and the upper element: there is no function that is directly linked to the phase for molding a material. Thus, it is never directly in contact with the material to be molded, does not exert force on the latter, and, unlike the matrix 12, does not exhibit a molding or heating zone.

Between the matrix 12 and the upper element 20, there is arranged an airtight and flexible membrane 42, such as a "depression tank," designed to put a material 44 to be transformed under pressure so as to flatten it against the surface 16 of the molding zone 14.

An inductor network 30, electrically connected in parallel or in series and connected to a current generator, is arranged around the unit that is formed by the matrix 12 and the upper element 20. Each inductor 30 comprises a conductive coil and comprises two parts 32, 34 that can be separated. The lower part 34 is integral with the matrix 12, while the upper part 32 is integral with the upper element 20.

FIG. 1 shows the matrix 12 and the upper element 20 before operation, separated from one another to allow the installation of the material to be transformed.

Figure 6:
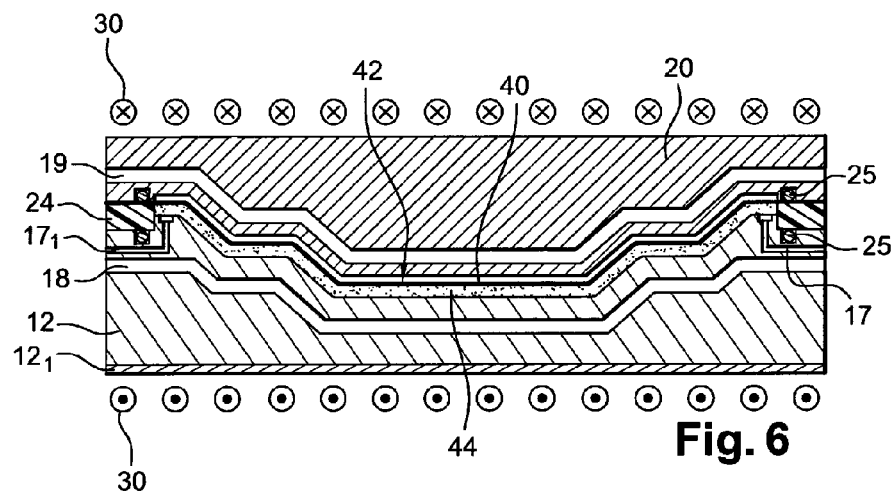
FIG. 6 shows a cutaway view of a variant of the device of FIG. 1, the cutaway being made in a direction analogous to FIGS. 5a and 5b.

After the installation of a material 44, as shown in FIG. 2, the upper element 20 is moved toward the matrix 12 so as to delimit an air gap with suitable dimensions. In the example, electrically insulating wedges 24 (and therefore transparent wedges in the electromagnetic field) are provided for this purpose between the upper element 20 and the matrix 12. These wedges constitute a reference stop for the upper element 20 (which should not rest or enter into contact with the material 44), while ensuring electrical insulation between the latter and the matrix 12 that is necessary for the operation of the device. Thus, the desired air gap level is obtained owing to the suitable level of the wedges 24. It is possible, however, to consider instead any alternative solution, for example a direct contact between the upper element and the matrix, whereby one of the two is coated with an electrical insulator. In one variant, the wedges 24 also make it possible to ensure sealing between the flexible membrane 42 and the matrix 12. In this case, they can take the shape of a frame that circumscribes the perimeter of the molding zone. It may be possible to produce this frame from any suitable material, for example material that is ceramic, thermosetting, thermoplastic, silicone, etc. By contrast, owing to the presence of deformable pressure means that will be created in an electrically insulating material, the molding zone does not require a particular precaution, even in the case of the transformation of parts made of an electrically conductive material (for example, those that contain carbon fibers). In the case where the wedges 24 do not ensure the sealing between the matrix 12 and the upper element 20, seals 25 that rest on either side of the wedges 24 are provided, as shown in FIG. 6. In one variant, sealing can be ensured by the membrane 42 itself without it being necessary to provide additional seals.

During the transformation phase, as shown in FIG. 2, the material 44 is clamped and kept under pressure against the surface 16 of the molding zone 14 of the matrix by the membrane 42, in which the vacuum is made by means of a vacuum pump (not shown), whereby for this purpose the matrix comprises an intake channel network 17 (depicted in FIG. 6). The upper element 20, not transparent in the electromagnetic field, makes it possible that the space delimited by the surfaces opposite the matrix 12 and the element 20 constitutes an air gap 40, thus confining the circulation of a magnetic field in this space. Thus, when alternating electrical currents $1i$ of frequency F, for example between 10 and 100 kilohertz, pass through the inductor means that comprise conductive coils 30, the inductors generate a magnetic field that envelops the matrix 12 and the element 20.

The thus generated magnetic field passes through these two elements and also circulates in the air gap, i.e., between the matrix 12 and the upper element 20. The magnetic field induces currents in the direction opposite to the direction of the currents $1i$, and the presence of the air gap makes it possible to generate induced currents $Ic_1$ and $Ic_2$ that circulate respectively at the surface of the matrix and the element 20. These induced currents $Ic_1$ and $Ic_2$ therefore have a thermal action exclusively at the surface of these two elements.

The device according to the invention is all the more effective since the presence of the air gap 40 has the effect of concentrating the magnetic flow within itself, which also increases the action of the magnetic field at the level of the molding zones, and therefore the inductive energy provided at the surface of the molding zones. It is therefore possible to heat quickly and locally the surface of the molding zone 14, directly at the molding zone/material interface, and not within the thickness of the mold element, which represents a significant energy savings, while implementing a suitable pressurization of the part owing to the flexible membrane.

Figures 5A, 5B:
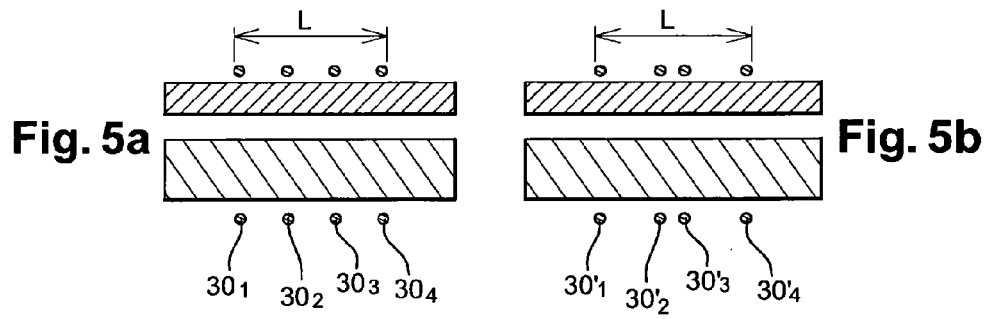
FIGS. 5a and 5b show two different arrangements of the inductors for the device of FIG. 2, whereby these views correspond to simplified cutaways along the line AA of FIG. 2.

The air gap also has the effect of limiting the influence of the geometry and/or the distribution of the inductors on the resulting heating because the air gap 40 has the effect of uniformly distributing the energy that is provided by the inductors. Thus, induction coils $30'_1$ to $30'_4$ (FIG. 5b) that are distributed irregularly over a length L around the mold have virtually the same effect as the same number of induction coils $30_1$ to $30_4$ (FIG. 5a) that are distributed uniformly over the same length. This arrangement makes it possible to select arbitrarily the distribution of the induction coils. It is recalled that on the contrary, a standard configuration with a coil inductor and an electroconductive charge without an air gap produces an unequal energy distribution, whereby the injected energy has a maximum facing each induction coil. This possibility of having an unequal distribution of the inductor coils proves particularly advantageous because, in the device that is the object of the invention, the induction coils surround the mold, and the latter can be equipped with a certain number of projecting elements, such as slide bars, ejectors, etc.

In addition to an ideal distribution of the injected energy, therefore offering a uniform temperature at the surface of the molding zone, the presence of the air gap also makes it possible to regulate and to control this temperature very finely. It is thus possible to very precisely monitor the temperature elevation rate (in ° C./minute), which is necessary for certain materials that require complying with the constant temperature elevation rates.

The device according to the invention also exhibits the advantage of reducing the design and production costs of a mold. Actually, the upper element 20 can be designed as a single piece, obtained by, for example, molding or forging, and does not require a particular surface state, and therefore costly machining, contrary to the matrix 12 and more particularly to the molding zone 14. In addition, the latter is not designed to apply pressure on the material to be transformed, which imposes almost no constraint except for the mechanical strength of the element 20 and allows a great freedom in the selection of materials. In some cases, the element 20 will also be of a slight thickness compared to the matrix 12, which again reduces the production cost of the element 20 and more generally of the device according to the invention.

Figures 7A, 7B:
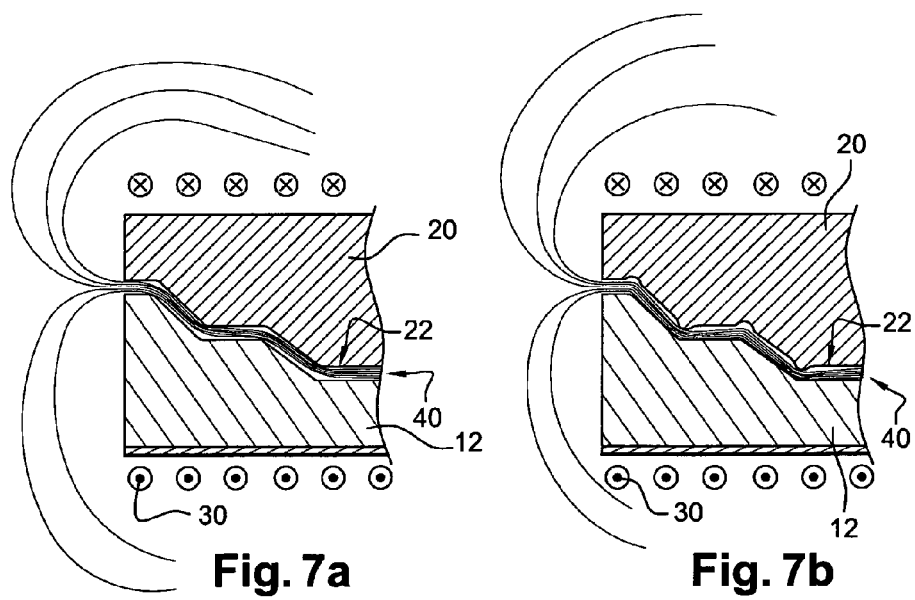
FIGS. 7a and 7b show a detail of the device of FIG. 6, respectively in two different configurations.

Another advantage of the invention resides in the fact that whereby the element 20 is not designed to be in contact directly, to heat or to exert forces with/on the material to be transformed, a great freedom is maintained within the definition of its shape: since the element 20 does not play the role of a counter-mold, the shape of its surface 22 located opposite the molding zone 14 can be independent of the shape of the molding zone (and therefore of the final part). This freedom within the definition of the shape of this surface 22 makes it possible, for example, to modulate very finely the heating achieved by manipulating the inductive and resistive phenomena. It is possible in particular to manipulate the level of the air gap to limit its underheating or overheating. For example, as shown in FIG. 7b, locally reducing the level of the air gap—i.e., at the location in question, the upper element 20 will be closer to the matrix 12 than to other locations—makes it possible to prevent local underheating at the matrix, whereby the reduction of the air gap makes it possible to increase the concentration of the magnetic flow that passes through the air gap at this location and therefore its effect. It is thus possible to see, in FIGS. 7a and 7b, the circulation of the magnetic field generated by the inductors 30, in particular inside the air gap 40. FIG. 7a shows an air gap 40 with a constant thickness, and it is seen that when the latter is not rectilinear, the flow lines are more concentrated inside the curve that is described by the air gap than on the outside because the magnetic flow follows the path of least resistance. Overheating and underheating therefore occur at these curved locations, respectively inside and outside of the curve. FIG. 7b shows an air gap 42 with a non-constant thickness, in particular with a thickness that is modified at locations where the air gap describes a curve. As appropriate, an increase or a reduction of this thickness makes it possible to correct the non-homogeneous distribution of the magnetic flow noted in FIG. 7a.

The non-magnetic material that is used for constituting the element 20 preferably has a low electrical resistivity, like copper or aluminum, for example. This makes it possible to prevent energy losses to the maximum. Actually, with the element 20 being electrically conductive, current induced by the magnetic field passes through it, but almost all of the energy that is generated by the inductors is injected into the matrix. For example, if the element 20 is made of aluminum, the energy that it receives shows about 5% of the energy that is injected into the matrix 12.

So as to minimize the energy losses in the matrix 12, the molding zone 14 comprises a magnetic material that optionally has a Curie point, while the remainder of the matrix 12 comprises a non-magnetic or not very magnetic compound. The magnetic material that constitutes the molding zone 14 preferably exhibits an electrical resistivity that is more significant than that of copper, such as for example, nickel-, chromium-, and/or titanium-based steel alloys. A significant electrical resistivity of the molding zone constitutes an advantage because it allows a more effective induction heating. It should be noted, however, that the magnetic permeability of the material also influences the yield of the induction heating. The remainder of the matrix 12 comprises a material that creates a good compromise between mechanical characteristics and magnetic and electrical properties. Actually, so as to limit the energy losses and to concentrate all of the action of the heating at the surface 16 of the molding zone 14, the material that constitutes the matrix 12 should be as little magnetic and resistive as possible, while exhibiting the mechanical strength that is necessary for the significant and repeated forces of the molding phases. In this connection, stainless steel and copper represent an advantageous compromise.

In a variant shown in FIG. 6, the matrix can be produced according to the method that is described in the International Application No. 2007/031660, whereby the matrix 12 as well as the molding zone 14 consist integrally of a magnetic material, the surfaces of the latter located opposite the inductor means being covered by a shield layer $12_1$ made of a non-magnetic material such as copper, except for the surface 16 of the molding zone 14. In this configuration, the shield is such that its thickness is greater than the depth of penetration of the electromagnetic field. Thus, the induced currents circulate in the shield layer, creating little heating and few energy losses, except at the location of the surface of the molding zone, where the material is very reactive to induction heating.

When the material that constitutes the molding zone 14 has a Curie point, at a temperature close to this Curie point, the material loses its magnetic properties and the induction heating decreases greatly, which is one of the possibilities for regulating the heating temperature around the Curie point.

The device that is shown in FIGS. 1 and 2 is provided with a cooling system to make possible the creation or the transformation of parts by heating at a high speed, whereby the cooling is implemented between two processing cycles. For this purpose, a network of channels 18 making it possible to circulate a cooling liquid close to the molding surfaces is provided in the matrix 12 of the molding zone 12. The thus achieved cooling is very high-performing, on the one hand because the metal mold element is thermally very conductive, and on the other hand because the channels can be arranged close to the surface 16 of the molding zone 14. A very high-performing cooling is therefore implemented because it is quick and homogeneous over the entire part. This latter particular feature is of crucial importance for certain materials such as polyester, for which problems of releasing constraints are posed during the cooling if the part is not kept in its shape for the entire cooling time (spiral part, etc.). Therefore, for certain materials, an entire production stage, called a shaping stage, requiring, for example, a holding frame, an oven for a controlled drop in temperature, etc., is eliminated.

The upper element 20 is preferably also provided with a cooling channel network 19, but this network is designed primarily for cooling the upper element 20 when the latter heats during cycles. In practice, the rise in temperature of the upper element 20 will be rather slow, and it will be possible to implement the cooling periodically, after a certain number of heating cycles.

The inductors 30 are made of two parts 32, 34 that can be separated from and that are integral with respectively the matrix 12 and the upper element 20, which makes possible a quick extraction of the part 44 after molding and therefore contributes to a high-speed production. During the transformation of a material, electrical continuity between the two parts 32, 34 of the inductor network is ensured by electrical contactors 36.

Figure 3:
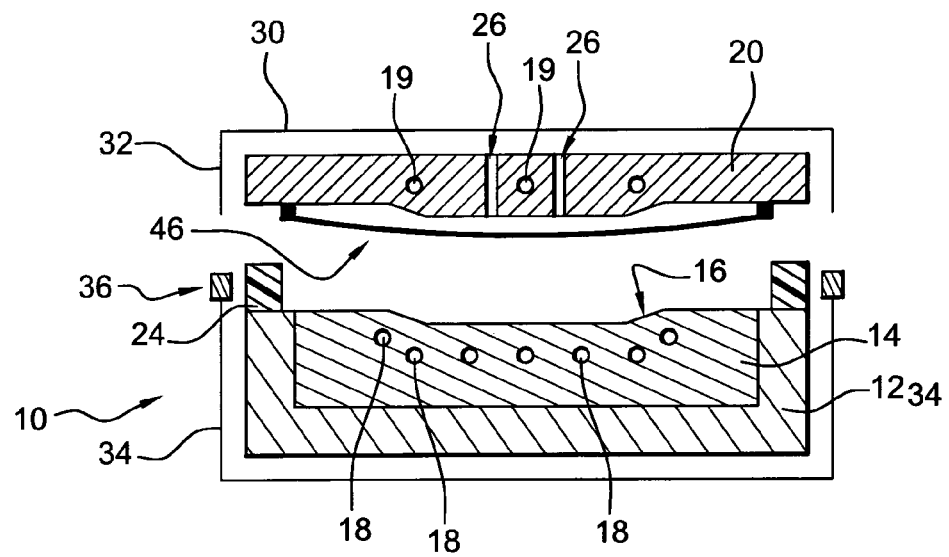
FIGS. 3 and 4 show a variant of the preceding device.
Figure 4:
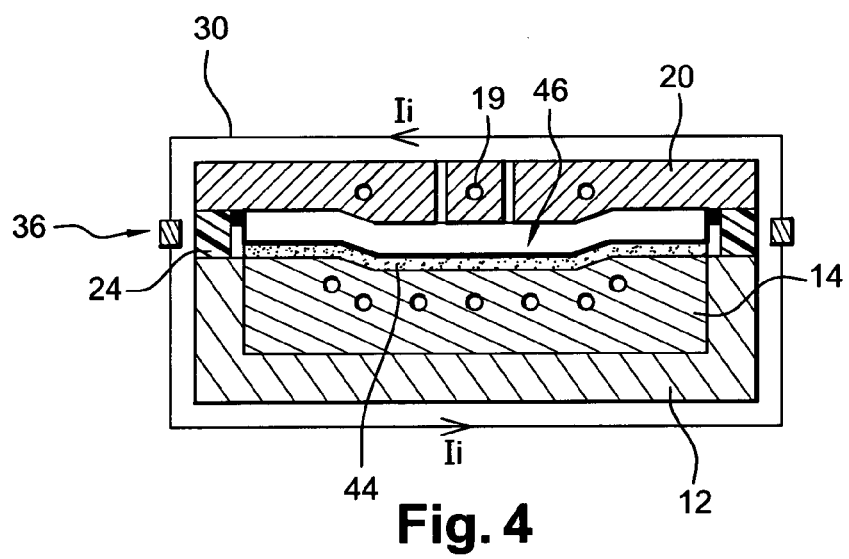

FIG. 3 shows a variant of the invention in which the flexible membrane is integral with the upper element 20 and no longer with the matrix 12. In this configuration, the flexible membrane is flattened against the matrix and the part to be transformed by overpressure, i.e., by inflation. For this purpose, the membrane is elastic and able to withstand significant pressure, for example between 1 and 15 bar, thus making it possible to apply significant forces to the part to be transformed without requiring the use of significant mechanical means (pressing, etc.). It is also possible to use inflatable bladders that have a shape that is suitable for the molding zone in the case of very complex shapes. In this configuration, the upper element 20 has channels 26 that make it possible to link the space encompassed between the membrane 46 and the surface 22 of the element 20 with a pressure source (not shown). So as to promote a quick cooling while maintaining pressure on the part, it can be envisioned that the pressure source makes it possible to generate a circulation of air at the desired pressure inside the membrane. For this purpose, it will be possible, for example, to create an air intake channel and an air discharge channel, the latter being equipped with a pressure relief valve that is calibrated to the desired minimum pressure, while the pressure source provides air at a significantly higher pressure.

To create the membrane 46, it is possible to use, for example, materials such as silicone or thermoplastics that withstand a relative deformation of 100% or more. Preferably, the material that is used should withstand temperatures on the order of 300° C.

If it is desired to implement processes with resin transfer, of the RTM type, it will be possible to provide an intake channel network 17₁ of the resin, as shown in FIG. 6, the intake channel network 17 being used in this case also to evacuate the resin. The resin intake and discharge channels will be arranged so as to promote optimal filling and distribution of the resin. In the example of FIG. 6, the latter are located on opposite sides of the matrix 12.

In one variant, it will be possible to use two compacting means in combination: one inflatable membrane arranged on the upper element 20 with an underpressure membrane arranged on the matrix 12. Such a configuration will be useful in particular for monitoring the level of porosity of the finished part. Actually, by creating the vacuum under the underpressure membrane before exerting significant pressure with the inflatable membrane, it will be possible to exert significant force on the part while preventing air from infiltrating into the latter. For this same purpose, it will also be possible to use a single membrane, produced in a unique material or comprising at least two layers of two different materials, whereby this unique membrane is subjected both to underpressure and overpressure.

In one variant, it will be possible to provide for attaching the underpressure membrane 42 to the upper element 20. Thus, the installation and the removal of the membrane 42 are simplified, whereby its movement is linked to that of the element 20.

As is done conventionally, mechanical means (not shown) for ejection of the manufactured part are also provided.

The invention claimed is:

1. Heating device (10) for the transformation of a material (44), comprising:
    a lower mold element (12), or matrix, made of an electrically conductive material and comprising a molding zone (14) that is made of magnetic material and that is designed to be in contact with the material to be transformed;
    an upper element (20) that does not directly contact the material to be transformed and does not exert force on the material to be transformed, the upper element being made of a non-magnetic, electrically conductive material that has low electrical resistivity;
    inductor means (30) for generating a magnetic field arranged around a unit that is formed by the matrix (12) and the upper element (20);
    electrically insulating and transparent wedges (24) in the magnetic field, arranged between the matrix and the upper element and defining an air gap between opposing surfaces of said matrix and said upper element, wherein said air gap is maintained during heating and transformation of the material to be transformed, wherein the magnetic field circulates in the air gap and induces currents at the surface of the molding zone (14) of the matrix (12), thus making it possible to localize the action of the inductor means at the interface of the molding zone/material to be transformed; and
    deformable pressure means comprising a flexible membrane (42, 46) in the air gap between the matrix (12) and the upper element (20), the flexible membrane being adapted to exert uniform pressure on the material to be transformed and to flatten the material to be transformed against the molding zone.

2. Device according to claim 1, in which the insulating wedges (24) are adapted to seal between the deformable pressure means and one of the matrix (12) and the upper element (20).

3. Device according to claim 1, in which the flexible membrane (42) is linked in an airtight manner to the matrix (12), and further comprising means for generating underpressure between the membrane (42) and the matrix (12).

4. Device according to claim 3, in which the flexible membrane (46) is linked in an airtight manner to the upper element (20), and further comprising means for generating overpressure between the membrane (46) and upper element (20).

5. Device according to claim 4, further comprising means for generating underpressure between the membrane (42, 46) and the matrix (12), wherein the means for generating underpressure and the means for generating overpressure are adapted to be actuated simultaneously or successively.

6. Device according to claim 4, comprising two of said flexible membrane (42, 46), the first being an underpressure membrane and the second being an overpressure membrane.

7. Device according to claim 1, in which the pressure means are integral with the upper element (20).

8. Device according to claim 1, in which the pressure means are integral with the matrix (12).

9. Device according to claim 1, in which the molding zone (14) comprises a magnetic compound.

10. Device according to claim 9, in which a part of the matrix (12) comprises a material that is different from the one that constitutes the molding zone (14).

11. Device according to claim 1, in which the matrix (12) comprises a magnetic material, and wherein surfaces of the matrix located opposite said inductor means, except for the surface (16) of the molding zone (14), is covered by a shield layer of a non-magnetic material that prevents penetration of the magnetic field into the matrix (12).

12. Device according to claim 1, in which the upper element (20) comprises a non-magnetic material.

13. Device according to claim 1, in which the molding zone (14) comprises a cooling channel network (18).

14. Device according to claim 1, in which the upper element (20) comprises a cooling channel network (19).

15. Device according to claim 1, in which the frequency F of the magnetic field that is generated by the inductor means is at least equal to 10 kHz.

16. Device according to claim 1, in which the inductor means (30) comprise two parts (32, 34) that can be separated and that are respectively integral with the matrix (12) and the upper element (20).

* * * * *